US012683265B2

(12) United States Patent
Wang et al.

(10) Patent No.: US 12,683,265 B2
(45) Date of Patent: Jul. 14, 2026

(54) ELECTRONIC ELEMENT CONNECTION STRUCTURE AND ELECTRONIC DEVICE

(71) Applicant: HONOR DEVICE CO., LTD., Shenzhen (CN)

(72) Inventors: Yan Wang, Shenzhen (CN); Jiuliang Gao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 897 days.

(21) Appl. No.: 17/791,257

(22) PCT Filed: Feb. 10, 2022

(86) PCT No.: PCT/CN2022/075892
§ 371 (c)(1),
(2) Date: Nov. 3, 2022

(87) PCT Pub. No.: WO2022/227785
PCT Pub. Date: Nov. 3, 2022

(65) Prior Publication Data
US 2024/0178549 A1      May 30, 2024

(30) Foreign Application Priority Data

Apr. 30, 2021    (CN) .......................... 202120944650.7

(51) Int. Cl.
H01Q 1/24          (2006.01)
H01Q 1/38          (2006.01)
(Continued)

(52) U.S. Cl.
CPC .............. H01Q 1/243 (2013.01); H01Q 1/38 (2013.01); H01Q 1/52 (2013.01); H04B 1/3816 (2013.01)

(58) Field of Classification Search
CPC . H01Q 1/243; H01Q 1/38; H01Q 1/52; H04B 1/3816; H05K 1/18
See application file for complete search history.

(56) References Cited

U.S. PATENT DOCUMENTS

| 4,682,180 A | 7/1987 | Gans |
| 2005/0017902 A1 | 1/2005 | Oyama et al. |
| (Continued) | | |

FOREIGN PATENT DOCUMENTS

| CN | 2565233 Y | 8/2003 |
| CN | 201830551 U | 5/2011 |
| (Continued) | | |

OTHER PUBLICATIONS

Suovanen Jeff: "Samsung Galaxy S7 Teardown", Mar. 11, 2016, pp. 1-32, XP093066497, Retrieved from the Internet: URL:https://www.ifixit.com/Teardown/Samsung+Galaxy+S7+Teardown/56686#s122937 [retrieved on Mar. 15, 2025] (Year: 2016).*
(Continued)

*Primary Examiner* — Alexander H Taningco

(57) ABSTRACT

An electronic element connection structure includes a connecting board, a first element, and a second element. The first element is connected to one side of the connecting board, and the second element is connected to an other side of the connecting board. A vertical projection of the first element on a preset plane overlaps with a vertical projection of the second element on the preset plane, where the preset plane is parallel to a plane on which one of the sides of the connecting board is located. A distance between the first element and the second element in a direction perpendicular to the preset plane is greater than or equal to a threshold distance.

20 Claims, 8 Drawing Sheets

F1

(51) Int. Cl.
H01Q 1/52 (2006.01)
H04B 1/3816 (2015.01)

(56) References Cited

U.S. PATENT DOCUMENTS

| | | | |
|---|---|---|---|
| 2014/0063336 A1* | 3/2014 | Choi | H04N 23/51 |
| | | | 348/374 |
| 2014/0078018 A1 | 3/2014 | Wong et al. | |
| 2018/0076526 A1* | 3/2018 | Garcia | H01Q 19/30 |
| 2019/0128937 A1 | 5/2019 | Choi et al. | |
| 2020/0053894 A1 | 2/2020 | Huang et al. | |
| 2020/0186180 A1 | 6/2020 | Park et al. | |
| 2020/0335850 A1 | 10/2020 | Oh et al. | |
| 2021/0242568 A1 | 8/2021 | Zhang et al. | |
| 2022/0123456 A1* | 4/2022 | Chang | H01Q 1/243 |
| 2023/0299506 A1* | 9/2023 | Park | H01Q 21/28 |
| | | | 343/702 |
| 2024/0170830 A1* | 5/2024 | Wang | H04B 1/3816 |
| 2024/0283858 A1* | 8/2024 | Yin | H01Q 1/52 |

FOREIGN PATENT DOCUMENTS

| | | | | |
|---|---|---|---|---|
| CN | 102789590 A | | 11/2012 | |
| CN | 202550062 U | * | 11/2012 | H01Q 1/2275 |
| CN | 202838355 U | | 3/2013 | |
| CN | 203086534 U | | 7/2013 | |
| CN | 103762411 A | | 4/2014 | |
| CN | 204155964 U | | 2/2015 | |
| CN | 107454215 A | | 12/2017 | |
| CN | 207020704 U | | 2/2018 | |
| CN | 207022058 U | | 2/2018 | |
| CN | 107948355 A | | 4/2018 | |
| CN | 208460973 U | | 2/2019 | |
| CN | 110061038 A | | 7/2019 | |
| CN | 110635234 A | | 12/2019 | |
| CN | 111836507 A | | 10/2020 | |
| CN | 211791724 U | | 10/2020 | |
| CN | 117097825 A | * | 11/2023 | |
| TW | I243641 B | | 11/2005 | |
| TW | M331816 U | | 5/2008 | |
| WO | 2016046184 A1 | | 3/2016 | |
| WO | 2020082361 A1 | | 4/2020 | |

OTHER PUBLICATIONS

Suovanen Jeff: "Samsung Galaxy S7 Teardown", Mar. 11, 2016, pp. 1-32.

Suovanen Jeff: "Samsung Galaxy S7 Teardown—Step 13—detailed view", Mar. 11, 2016, pp. 1-2.

Naronha Evan: "Samsung Galaxy S6 Edge Teardown", Apr. 10, 2015, pp. 1-26.

Naronha Evan: "Samsung Galaxy S6 Edge Teardown—Step 12—detailed view", Apr. 10, 2015, pp. 1-2.

Hodson David: "Samsung Galaxy S4 Teardown", Apr. 27, 2013, pp. 1-30.

Ding Mingshi et al: "Design of a Telecardiology Monitoring Terminal Based on Mobile Communication", Journal of Tianjin University. 2004(12), Dec. 25, 2004, 6 pages.

* cited by examiner

01

ELECTRONIC ELEMENT CONNECTION STRUCTURE AND ELECTRONIC DEVICE

CROSS-REFERENCE TO RELATED APPLICATIONS

This application is a National Stage of International Application No. PCT/CN2022/075892, filed on Feb. 10, 2022, which claims priority to Chinese Patent Application No. 202120944650.7, filed on Apr. 30, 2021. The disclosures of which are incorporated herein by reference in their entireties.

TECHNICAL FIELD

This application relates to the field of electrical connection structures, and in particular, to an electronic element connection structure and an electronic device.

BACKGROUND

With the development of science and technology, demands on the mobility and the portability of electronic devices are increasingly high, and the external size of an electronic device is one of the important factors affecting the portability thereof.

To implement different functions of an electronic device, a plurality of electronic elements (for example, an antenna elastic piece) are usually mounted. When an antenna elastic piece is mounted in the electronic device, other components are usually connected to a circuit board on which the antenna elastic piece is mounted. To avoid mutual interference between the antenna elastic piece and the other components, a specific avoidance space is usually arranged between the antenna elastic piece and the other components. The manner of arranging an avoidance space in the prior art causes occupation of large space. Consequently, the internal layout of the electronic device is not compact enough, which limits the downsizing of the electronic device to some extent.

SUMMARY

Embodiments of this application provide an electronic element connection structure and an electronic device, to reduce the space occupied by the connection structure in the transverse size, thereby reducing the occupation of transverse space inside the electronic device, to help to reduce the external size of the electronic device.

To achieve the foregoing objective, the following technical solutions are used in this application:

According to a first aspect, an electronic element connection structure is provided, including a connecting board, a first element, and a second element. The first element is connected to one side of the connecting board, and the second element is connected to an other side of the connecting board. A vertical projection of the first element on a preset plane overlaps with a vertical projection of the second element on the preset plane, or a distance between a vertical projection of the first element on a preset plane and a vertical projection of the second element on the preset plane is less than a threshold distance, where the preset plane is parallel to a plane on which one of the sides of the connecting board is located. A distance between the first element and the second element in a direction perpendicular to the preset plane is greater than or equal to the threshold distance.

The threshold distance is a minimum distance that prevents mutual interference between the first element and the second element.

Based on the above, the first element and the second element are arranged on two sides of the connecting board, and are arranged such that the vertical projection of the first element on the preset plane overlaps with the vertical projection of the second element on the preset plane, that is, are arranged such that the first element and the second element are arranged at corresponding positions on the two sides of the connecting board, and the distance between the first element and the second element is greater than or equal to the preset threshold distance, to avoid mutual interference between the first element and the second element while forming space on the two sides of the connecting board as an avoidance space between the first element and the second element meanwhile, thereby reducing the occupation of transverse space. When the connecting board is arranged, a thickness direction thereof is set to be consistent with a thickness direction of an electronic device, that is, the avoidance space between the first element and the second element is a space in the thickness direction of the electronic device, which avoids the occupation of the transverse space of the electronic device, to help to reduce the external size of the electronic device.

With reference to the first aspect, in a possible design manner, the connecting board includes a first sub-connecting board and a second sub-connecting board, the first element is connected to a first side of the first sub-connecting board, and the second element is connected to a second side of the second sub-connecting board. A second side of the first sub-connecting board is connected to a first side of the second sub-connecting board, and an area of the first sub-connecting board is less than that of the second sub-connecting board. The first side of the first sub-connecting board is opposite to the second side of the first sub-connecting board, and the first side of the second sub-connecting board is opposite to the second side of the second sub-connecting board.

Based on the above, the two sub-connecting boards are arranged and combined into the connecting board, the first sub-connecting board and the second sub-connecting board are arranged in a superimposed manner, and a thickness of the connecting board can be increased at an overlapping position, so that the connecting board in this form has a simple process and lower manufacturing costs. The first element and the second element are arranged on the first sub-connecting board and the second sub-connecting board respectively, so that the first element and the second element are located on the two sides of the connecting board. The connecting board is thicker in this position, to help to increase the distance between the first element and the second element, so that the distance meets the threshold distance, and mutual interference between the first element and the second element is prevented. In addition, the transverse space occupied by the first element and the second element is reduced.

With reference to the first aspect, in a possible design manner, the first element is connected into the first sub-connecting board, and the distance between the first element and the second sub-connecting board in the direction perpendicular to the preset plane is greater than or equal to a preset distance.

Based on the above, the first element is arranged in the first sub-connecting board, and such a design manner provides a specific connection manner of the first element. A safety gap is arranged between the first element and the second sub-connecting board, to avoid interference between the first element and elements and circuits on the second sub-connecting board.

With reference to the first aspect, in a possible design manner, a protrusion is arranged on one side of the connecting board, and the first element is connected to the protrusion.

Based on the above, the protrusion is arranged, to increase a thickness of a partial region of the connecting board, and the first element and the second element are respectively arranged on the protrusion and the other side of the connecting board opposite to the protrusion, so that the distance between the first element and the second element can meet the threshold distance, to avoid mutual interference between the first element and the second element. Meanwhile, the avoidance space between the first element and the second element is formed in a longitudinal direction, to reduce the occupation of the transverse space.

With reference to the first aspect, in a possible design manner, a thickness of the first sub-connecting board is 0.4 mm to 1.0 mm, and a thickness of the second sub-connecting board is 0.4 mm to 1.0 mm.

Based on the above, the design manner provides a specific implementation of the first sub-connecting board and the second sub-connecting board.

According to a second aspect, this application provides an electronic device, including a housing and the electronic element connection structure described in the first aspect and any possible design manner thereof. The electronic element connection structure is connected into the housing.

DESCRIPTION OF EMBODIMENTS

Figure 1:
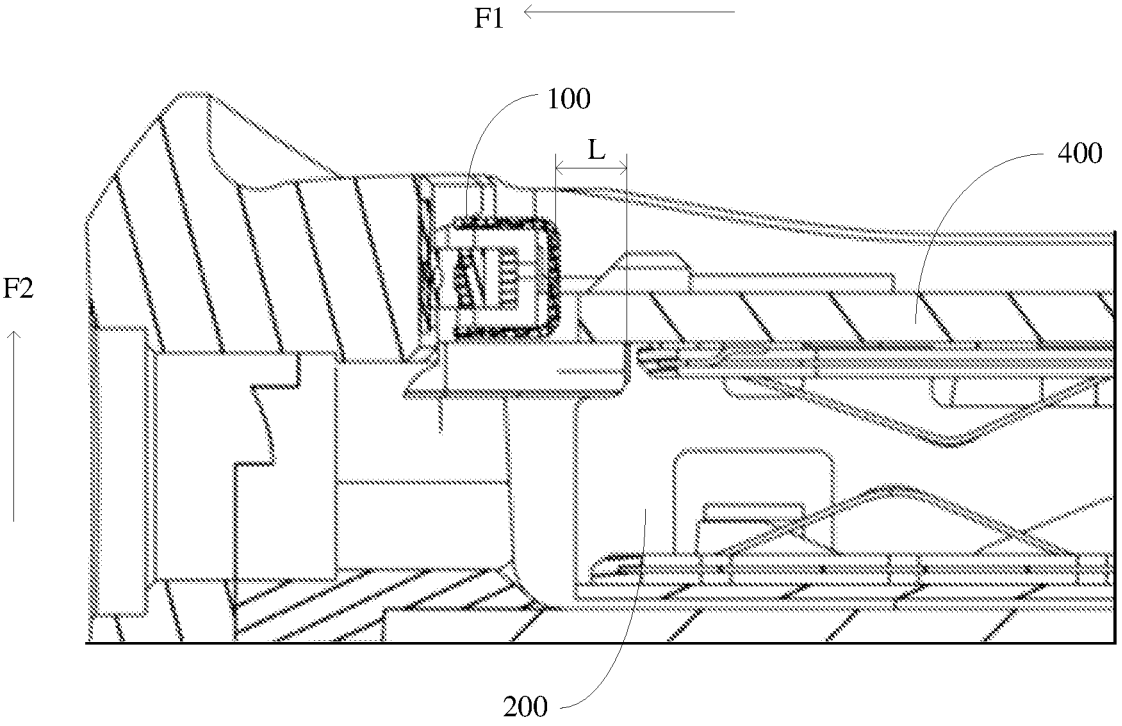
FIG. 1 is a schematic diagram of an electronic element connection structure in the prior art.

The following describes technical solutions of this application with reference to accompanying drawings.

In the embodiments of this application, the terms, such as "exemplarily" and "for example", are used to represent giving an example, an illustration or a description. Any embodiment or design scheme described by using "exemplarily" or "for example" in the embodiments of this application should not be explained as being more preferred or having more advantages than another embodiment or design scheme. Exactly, use of the term, such as "exemplarily" or "for example", is intended to present a related concept in a specific manner.

In the embodiments of this application, terms "first" and "second" are used merely for the purpose of description, and shall not be construed as indicating or implying relative importance or implying a quantity of indicated technical features. Therefore, a feature defined by "first" or "second" can explicitly or implicitly include one or more features.

It should be understood that, terms used in description of the various examples in this specification are merely for describing specific examples and are not intended to impose limitations. As used in the description of the various examples, singular forms, "a" or "an" and "the", are intended to also include plural forms, unless the context clearly indicates otherwise.

In this application, "at least one" means one or more, and "a plurality of" means two or more. "At least one of the following" or a similar expression thereof refers to any combination of these items, including one item or any combination of a plurality of items. For example, at least one of a, b, or c may represent a, b, c, a-b, a-c, b-c, or a-b-c, where a, b, and c may be singular or plural.

It should be further understood that the term "and/or" used in this specification refers to and includes any and all possible combinations of one or more of the associated listed items. The term "and/or" describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that, in this application, unless otherwise explicitly specified or defined, the terms such as "connection" should be understood in a broad sense. For example, the "connection" may be a fixed connection, a detachable connection, or an integral connection; or the "connection" may be a direct connection, or an indirect connection through an intermediary.

It should be further understood that, the terms "includes", "including", "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be understood that "an embodiment", "another embodiment", or "a possible design manner" mentioned throughout the specification means that particular features, structures, or characteristics related to the embodiments or the implementations are included in at least one embodiment of this application. Therefore, "in an embodiment of this application", "in another embodiment of this application", or "in a possible design manner" occurs in everywhere throughout the specification may not necessarily refer to the same embodiment. In addition, these specific features, structures, or properties may be merged in one or more embodiments in any proper manner.

FIG. 1 is a schematic connection diagram of an electronic element connection structure in the prior art. As shown in FIG. 1, in the figure, a direction indicated by F1 is a transverse direction, and a direction indicated by F2 is a longitudinal direction. A first element 100 is fixedly mounted on a mounting board 400, and a second element 200 is also fixedly mounted on the mounting board 400. The mounting board 400 is fixed into a housing of an electronic device, or is fixed onto a support member inside the electronic device. The first element 100 and the second element 200 are fixed at different positions on the mounting board 400 respectively, so that a specific distance is kept between the first element 100 and the second element 200 in the F1 direction.

Figure 2:
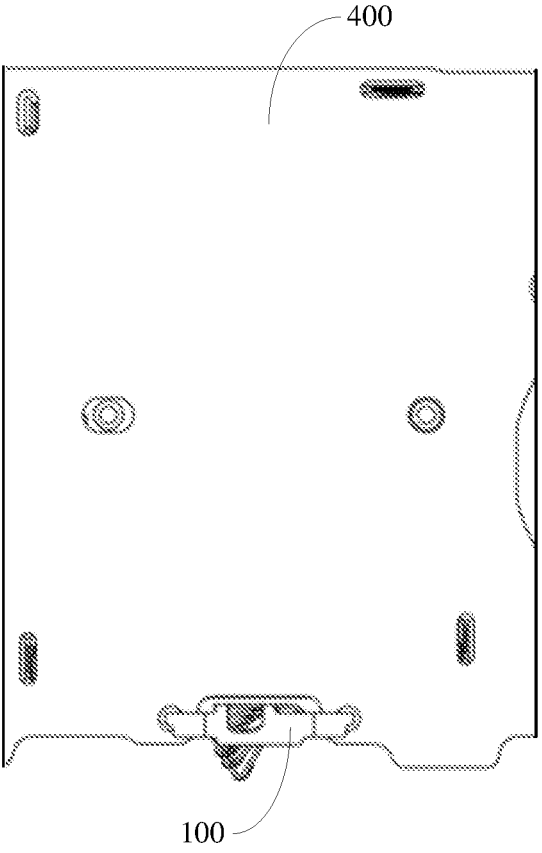
FIG. 2 is a schematic diagram of a first element mounted on a mounting board in the prior art.
Figure 3:
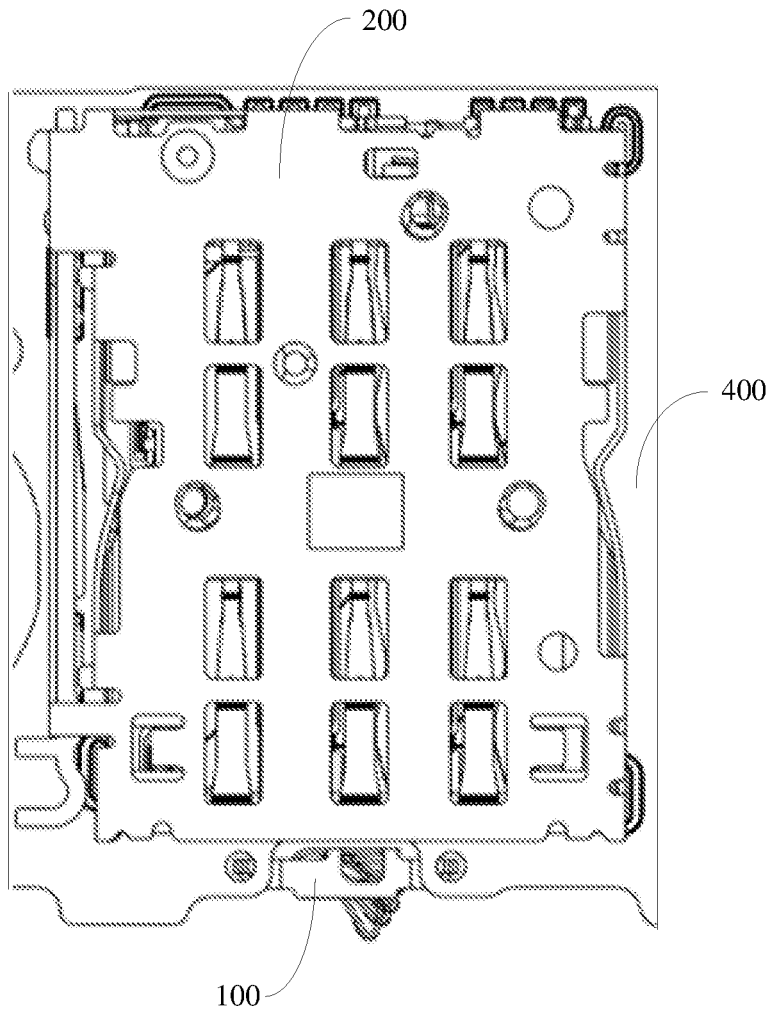
FIG. 3 is a top view of an electronic element connection structure in the prior art.

FIG. 2 is a schematic diagram of the first element 100 on the mounting board 400. The first element 100 is fixed on the mounting board 400, and is connected to a circuit on the mounting board 400. The mounting board 400 may be a PCB or another type of circuit board. FIG. 3 is a top view of an electronic element connection structure in the prior art. In addition, FIG. 3 shows relative positions between the first element 100 and the second element 200. As shown in FIG. 3, by taking a plane parallel to a plane of any side of the mounting board 400 as a reference plane, a projection of the first element 100 on the reference plane does not overlap with a projection of the second element 200 on the reference plane. That is, with reference to FIG. 1, the first element 100 does not overlap with the second element 200 in the longitudinal direction (the F2 direction).

As shown in FIG. 1, L in FIG. 1 is a distance between the first element 100 and the second element 200 in the figure. When the first element 100 and the second element 200 correspond to a specific element, for example, an antenna elastic piece, a subscriber identity module (Subscriber Identity Module, SIM) card holder, a microphone, a speaker, a motor, a camera, or a phone receiver, because positions of interference sources in elements are different, in this embodiment, the distance between the first element 100 and the second element 200 may be: a minimum linear distance between a body of the first element 100 and a body of the second element 200. Definitely, the distance between the first element 100 and the second element 200 may also be determined according to specific elements. For example, if the first element 100 is an antenna elastic piece, and the second element is a SIM card holder, the distance between the first element 100 and the second element 200 is essentially a minimum linear distance between the antenna elastic piece and a SIM card in the SIM card holder.

The distance L between the first element 100 and the second element 200 is a safety distance, and the distance L is also a threshold distance. When being arranged, the mounting board 400 is usually arranged transversely, that is, a board surface of the mounting board 400 is parallel to the F1 direction. A space indicated by L in the figure is an avoidance space between the first element 100 and the second element 200, and the avoidance space is a space in the transverse direction. The transverse direction (the F1 direction) is generally a length direction or a width direction of an electronic device, and the longitudinal direction (the F2 direction) is generally a thickness direction of the electronic device.

It can be learned from the above that, in the electronic element connection structures in the existing technical solutions, the space in the transverse direction is usually used as the avoidance space between the first element 100 and the second element 200, and consequently, the electronic element connection structure occupies more space in the transverse direction inside the electronic device, which affects the downsizing of the electronic device in the length and width directions, resulting in a larger external size of the electronic device.

To resolve the problem that the electronic element connection structure in the prior art occupies more space, the embodiments of this application provide an electronic element connection structure and an electronic device. The electronic element connection structure can reduce the space occupied by the electronic element connection structure in the transverse size, thereby reducing the occupation of internal space of the electronic device. The following describes the embodiments of this application in detail with reference to FIG. 4 to FIG. 8.

An embodiment of this application provides an electronic device. An electronic device 01 includes, for example, a mobile phone, a tablet computer, a personal digital assistant (personal digital assistant, PDA), an in-vehicle computer, and a smart wearable product. A specific form of the electronic device 01 is not specially limited in this embodiment of this application. For ease of description, an example in which the electronic device 01 is a mobile phone is described.

Figure 4:
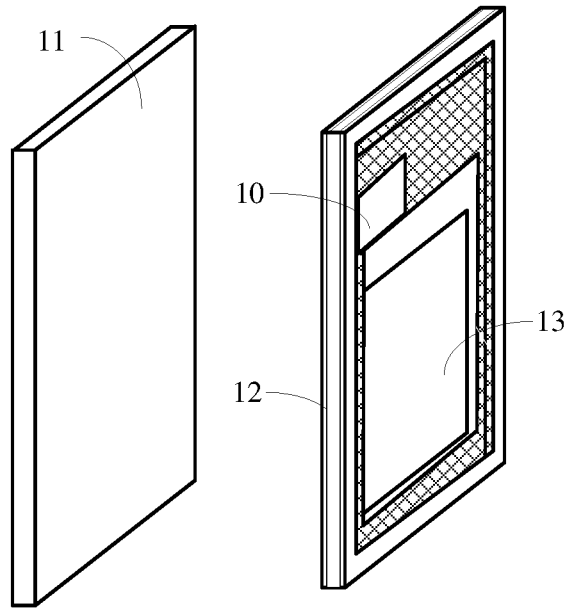
FIG. 4 is a schematic diagram of an electronic device according to an embodiment of this application.

FIG. 4 is a schematic diagram of an electronic device according to an embodiment of this application. As shown in FIG. 4, the electronic device 01 is a mobile phone, and mainly includes a display assembly (not shown in the figure), a housing 11, a middle frame 12, and an internal assembly 13. The display assembly is connected to one side of the middle frame 12, and the housing 11 is connected to an other side of the middle frame 12. The internal assembly 13 is arranged between the display assembly and the housing 11, and is fixedly connected to an inner side of the housing 11 or the middle frame 12. The internal assembly 13 may include a chip, a PCB, a memory, a sensor, and the like.

The mobile phone may further include an electronic connection structure 10 arranged in the housing 11, and the electronic connection structure 10 may be fixedly connected to the housing 11, or be fixedly connected to the middle frame 12 or the internal assembly 13. The mobile phone includes a plurality of electronic elements, for example, an antenna elastic piece, a subscriber identity module (Subscriber Identity Module, SIM) card holder, a microphone, a speaker, a motor, a camera, and a phone receiver. When the elements are mounted in the mobile phone, corresponding electronic connection structures are usually required for connection, and specific avoidance spaces need to be arranged.

Using an example in which a first element 100 is the antenna elastic piece, and a second element 200 is the SIM card holder, a specific structure of the electronic connection structure 10 is described below.

Figure 5:
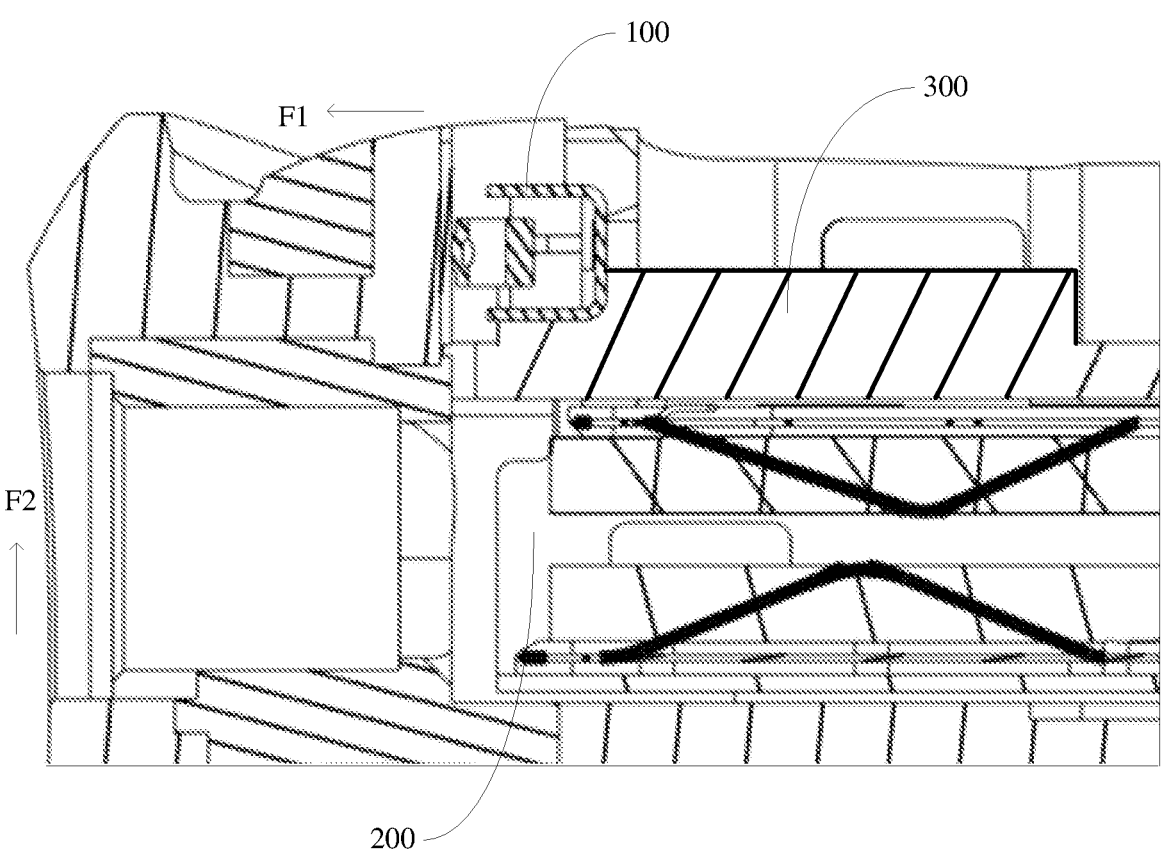
FIG. 5 is a schematic diagram of an electronic element connection structure according to an embodiment of this application.

FIG. 5 is a schematic diagram of an electronic element connection structure according to an embodiment of this application. As shown in FIG. 5, the connection structure includes a connecting board 300, a first element 100, and a second element 200, where the connecting board 300 is configured to connect the first element 100 and the second element 200. Specifically, the first element 100 is connected to one side of the connecting board 300, and the second element 200 is connected to an other side of the connecting board 300. The first element 100 and the second element 200 are arranged on two sides of the connecting board 300, which helps to make full use of the space on the two sides of the connecting board 300. A distance between a vertical projection of the first element 100 on a preset plane and a vertical projection of the second element 200 on the preset plane is less than L, or a vertical projection of the first element 100 on a preset plane overlaps with a vertical projection of the second element 200 on the preset plane.

The distance between the vertical projection of the first element 100 on the preset plane and the vertical projection of the second element 200 on the preset plane may be a minimum linear distance between a vertical projection of a body of the first element 100 on the preset plane and a vertical projection of a body of the second element 200 on the preset plane when the two projections do not overlap with each other, and definitely, may also be a minimum linear distance between a vertical projection of an interference source of the first element 100 on the preset plane and a vertical projection of an interference source of the second element 200 on the preset plane when the two projections do not overlap with each other. For example, the distance between the vertical projection of the first element 100 on the preset plane and the vertical projection of the second element 200 on the preset plane may be 0.

For example, when the first element 100 is an antenna elastic piece, and the second element is a SIM card holder, interference sources between the antenna elastic piece and the SIM card holder are an antenna elastic piece body and a SIM card in the SIM card holder respectively. Therefore, the distance between the vertical projection of the first element 100 on the preset plane and the vertical projection of the second element 200 on the preset plane is essentially a minimum linear distance between a vertical projection of the antenna elastic piece on the preset plane and a vertical projection of the SIM card in the SIM card holder on the preset plane when the two projections do not overlap with each other.

This embodiment of this application is described below by using a case in which the vertical projection of the first element 100 on the preset plane overlaps with the vertical projection of the second element 200 on the preset plane.

It should be noted that, the preset plane in this application is a plane parallel to a plane on which one of the sides of the connecting board 300 is located. With reference to FIG. 5, it can be learned that, when the connecting board 300 is arranged, planes on the two sides of the connecting board 300 are parallel to an F1 direction and perpendicular to an F2 direction. It can be learned from the above that, the preset plane is perpendicular to the F2 direction. However, in actual production and processing, the foregoing requirements may not be fully met due to errors and other reasons.

In this embodiment of this application, the vertical projection of the first element 100 on the preset plane is a first projection, the vertical projection of the second element 200 on the preset plane is a second projection, and the first projection overlaps with the second projection. The overlapping in this embodiment of this application includes partial overlapping and complete overlapping. That the first projection completely overlaps with the second projection means that the first projection and the second projection have the completely same shape and coincide with each other on the preset plane. However, because it is difficult for shapes of the first projection and the second projection to be completely consistent, that the first projection completely overlaps with the second projection rarely occurs.

That the first projection partially overlaps with the second projection includes the following several cases: the first projection completely falls within the second projection, and an overlapping part between the first projection and the second projection is of a size of the first projection; the second projection completely falls within the first projection, and an overlapping part between the first projection and the second projection is of a size of the second projection; and the first projection does not fall within the second projection, the second projection does not fall within the first projection either, the first projection and the second projection partially overlap with each other, and an area of an overlapping part is less than an area of the first projection and is also less than an area of the second projection.

In this embodiment of this application, the first projection coincides with the second projection, which can increase the coincidence between the first element 100 and the second element 200 in a direction perpendicular to the preset plane, that is, increase the coincidence between the first element 100 and the second element 200 in a longitudinal direction (the F2 direction), thereby reducing the occupation of space in a transverse direction. Since transverse space in an electronic device is mainly determined by a length and a width, the reduction of the occupation of the transverse space helps to reduce the length and the width of the electronic device.

In this embodiment of this application, a distance between the first element 100 and the second element 200 in the direction perpendicular to the preset plane is greater than or equal to a threshold distance. The distance between the first element 100 and the second element 200 is set to be not less than the threshold distance, to reserve an enough avoidance space for the first element 100 and the second element 200, thereby preventing mutual interference between the first element 100 and the second element 200 or making the interference between the first element and the second element acceptable in a controllable range. For example, when the first element is the antenna elastic piece, and the second element is the SIM card holder, a distance between the antenna elastic piece and the SIM card holder is greater than or equal to the threshold distance, so that the SIM card holder does not affect the performance of the antenna, and the antenna elastic piece does not affect data transmission of the SIM card holder. The threshold distance may be the distance L shown in FIG. 1.

It should be noted that, the connecting board 300 in this embodiment of this application is generally a circuit board, for example, a PCB. That the first element 100 is connected to the connecting board 300 means that a circuit in the first element 100 is connected to a circuit in the connecting board 300, and the first element 100 is fixedly connected to the connecting board 300. A connecting point between the first element 100 and the connecting board 300 is referred to as a first connecting pin. Because there are a plurality of connecting points between the first element 100 and the connecting board 300 generally, there may be a plurality of connecting pins between the first element 100 and the connecting board 300. The circuit that is in the connecting board 300 and that is connected to the first element 100 is referred to as a first circuit. That the second element 200 is connected to the connecting board 300 means that a circuit in the second element 200 is connected to a circuit in the connecting board 300, and the second element 200 is fixedly connected to the connecting board 300. A connecting point between the second element 200 and the connecting board 300 is referred to as a second connecting pin. Because there may be a plurality of connecting points between the second element 200 and the connecting board 300, there may be a plurality of connecting pins between the second element 200 and the connecting board 300. A circuit that is in the connecting board 300 and that is connected to the second element 200 is referred to as a second circuit. The preventing mutual interference between the first element 100 and the second element 200 includes: preventing contact between the first connecting pin and the second connecting pin from causing a short circuit, signal crossing, or another effect, and preventing interference between the first circuit and the second circuit. The fixed connection may be achieved by welding, which not only can ensure the connection strength between the first element 100 and the connecting board 300 and between the second element 200 and the connecting board 300, but also can conveniently achieve an electrical connection between the first element 100 and the second element 200 and the connecting board 300.

As shown in FIG. 5, in an embodiment of this application, the connecting board 300 may be a whole, but the connecting board 300 is a board with thicknesses that are not equal. Specifically, a protrusion is arranged on one side of the connecting board 300. The first element 100 is connected to the protrusion on the one side of the connecting board 300, and the second element 200 is connected to an other side of the connecting board 300. The first element 100 and the second element 200 are connected to two sides of the connecting board 300 respectively.

In this embodiment of this application, the protrusion is arranged, to increase a thickness of a partial region on the connecting board 300. The first element 100 is arranged on the protrusion of the connecting board 300, and the second element 200 is arranged on an other side of the connecting board 300, so that the connecting board 300 and the protrusion on the connecting board 300 isolate the first element 100 from the second element 200. The thickness of the protrusion is set, to adjust the distance between the first element 100 and the second element 200, so that a safe avoidance distance (namely, the threshold distance) is kept between the first element 100 and the second element 200, to avoid mutual interference between the first element 100 and the second element 200.

In addition, in this embodiment of this application, protrusions may be arranged on both sides of the connecting board 300, and the first element 100 and the second element 200 are connected to the protrusions on the two sides respectively, so that the distance between the first element 100 and the second element 200 can be adjusted by adjusting a height of the protrusion on one side or simultaneously adjusting heights of the protrusions on the two sides, to make the distance not less than the threshold distance, thereby avoiding mutual interference between the first element 100 and the second element 200.

Figure 6:
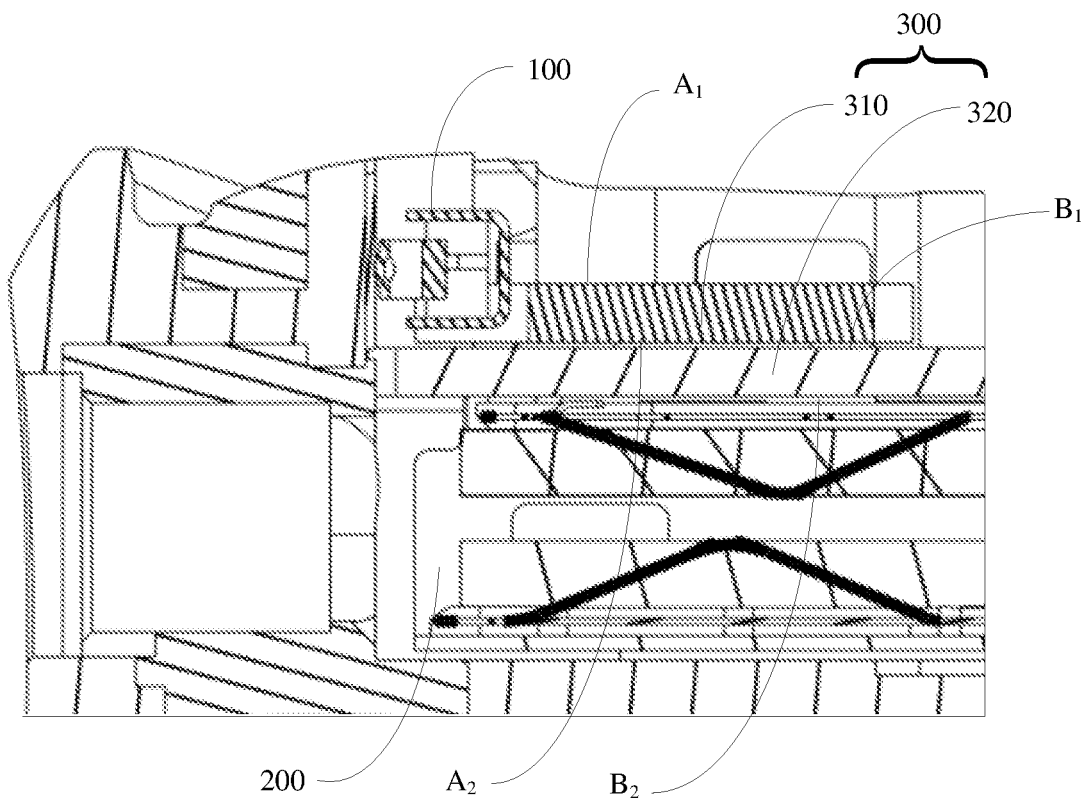
FIG. 6 is a schematic diagram of another electronic element connection structure according to an embodiment of this application.
Figure 7:
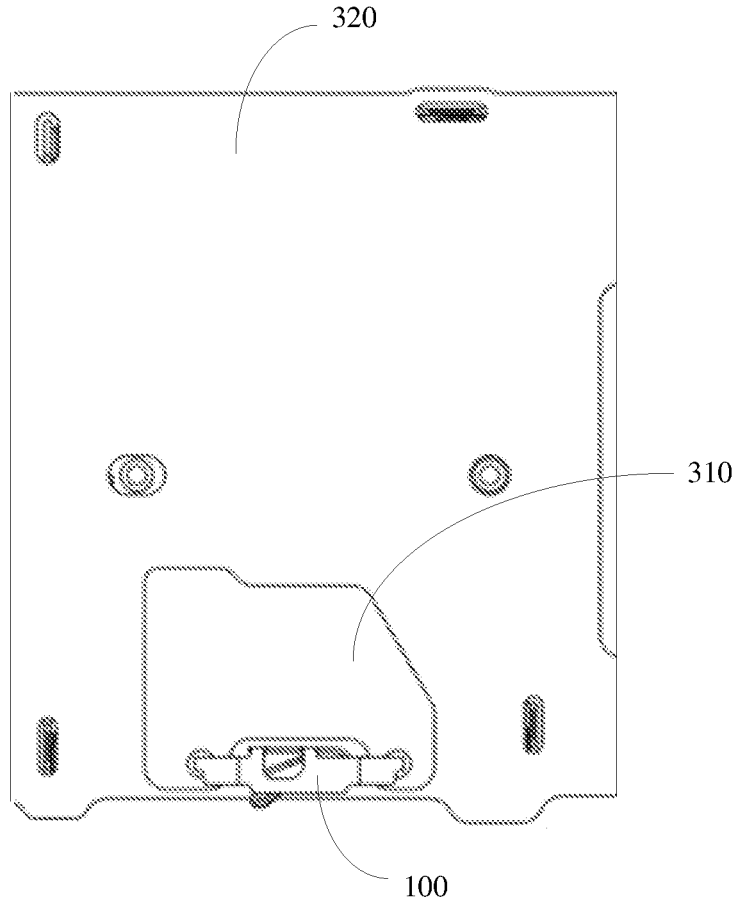
FIG. 7 is a top view of an electronic element connection structure according to an embodiment of this application.

In an embodiment of this application, the connecting board 300 may be a composite structure, for example, the connecting board 300 is a structure formed by a plurality of sub-connecting boards 300. FIG. 6 is a schematic diagram of another electronic element connection structure according to an embodiment of this application. FIG. 7 is a top view of an electronic element connection structure according to an embodiment of this application.

As shown in FIG. 6 and FIG. 7, a connecting board 300 includes a first sub-connecting board 310 and a second sub-connecting board 320. The first sub-connecting board 310 includes a first side $A_1$ and a second side $A_2$, and $A_1$ and $A_2$ are opposite to each other. The second sub-connecting board 320 includes a first side $B_1$ and a second side $B_2$, where $B_1$ and $B_2$ are opposite to each other. A first element 100 is connected to the first side $A_1$ of the first sub-connecting board 310, and a second element 200 is connected to the second side $B_2$ of the second sub-connecting board 320. The second side $A_2$ of the first sub-connecting board 310 is connected to the first side $B_1$ of the second sub-connecting board 320, and an area of the first sub-connecting board 310 is less than that of the second sub-connecting board 320. The second sub-connecting board 320 may be fixed into a housing of an electronic device, or be fixed onto a support member inside the electronic device.

The second side $A_2$ of the first sub-connecting board 310 and the first side $B_1$ of the second sub-connecting board 320 are connected together. Therefore, the first element 100 located on the first side $A_1$ of the first sub-connecting board

310 and the second element 200 located on the second side $B_2$ of the second sub-connecting board 320 are located on the two sides of the connecting board 300 respectively, which helps to make full use of the space on two sides of the connecting board 300. The two sub-connecting boards 300 are used and combined into the connecting board 300, and the first element 100 and the second element 200 are located on the two sides of the connecting board 300 respectively, that is, the first element 100 and the second element 200 are spaced by the first sub-connecting board 310 and the second sub-connecting board 320. The first sub-connecting board 310 and the second sub-connecting board 320 are arranged in a superimposed manner, and a thickness of the connecting board 300 can be increased at an overlapping position, thereby helping to increase a distance between the first element 100 and the second element 200, so that the distance meets a threshold distance. The thickness of the connecting board 300 is increased, which helps to arrange positions of a first connecting pin and a second connecting pin is achieved, to prevent contact between the first connecting pin and the second connecting pin, and is beneficial to the wiring of a first circuit and a second circuit, to prevent mutual interference between the first circuit connected to the first element 100 and the second circuit connected to the second element 200.

Figure 8:
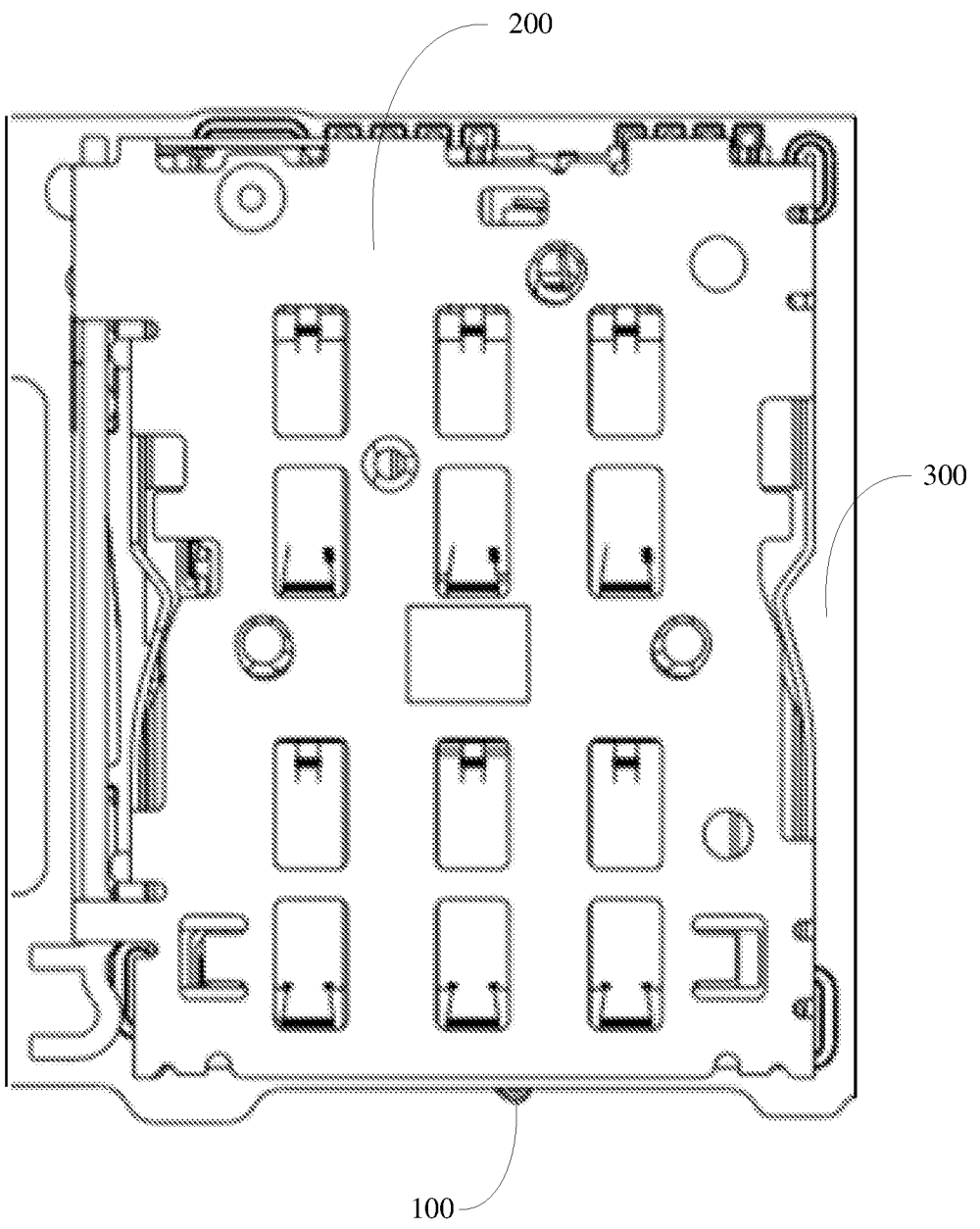
FIG. 8 is a bottom view of an electronic element connection structure according to an embodiment of this application.

FIG. 8 is a bottom view of an electronic element connection structure. It can be seen from FIG. 8 that, the first element 100 overlaps with the second element 200 in a bottom view direction (an F2 direction).

As shown in FIG. 7 and FIG. 8, because the first element 100 and the second element 200 are located on two sides of the connecting board 300 respectively, and a first projection of the first element 100 on a preset plane overlaps with a second projection of the second element 200 on the preset plane, so that the first element 100 and the second element 200 mainly occupy longitudinal space in the electronic device when being spatially arranged, which can reduce transverse space occupied by the first element 100 and the second element 200 in the electronic device.

In an embodiment of this application, the first element 100 may be connected to a surface of the first sub-connecting board 310, or may be connected to the interior of the first sub-connecting board 310. For example, the first element 100 may be connected to the first sub-connecting board 310 by using the dual in-line package (dual in-line package, DIP) technology, which can enhance the connection strength between the first element 100 and the first sub-connecting board 310. In addition, the first element 100 may also be connected to the first sub-connecting board 310 in the form of a breakout board element. When the first element 100 is partially or completely sunk into the first sub-connecting board 310, a distance between the first element 100 and the second sub-connecting board 320 in a direction perpendicular to the preset plane is greater than or equal to a preset distance. The preset distance is a safe process distance, and is mainly used for implementing a connection process between the first element 100 and the first sub-connecting board 310 and avoiding interference between the first element 100 and the second sub-connecting board 320. When the first element 100 is a breakout board element, for a specific mounting manner thereof, refer to the manners shown in FIG. 2 and FIG. 3.

Because the first side $B_1$ of the second sub-connecting board 320 and the second side $A_2$ of the first sub-connecting board 310 are connected together, the second sub-connecting board 320 and the first sub-connecting board 310 may be generally connected together by gluing or welding. Therefore, the first side $B_1$ of the second sub-connecting board 320 is basically attached to the second side $A_2$ of the first sub-connecting board 310. The distance between the first element 100 and the second sub-connecting board 320 in the direction perpendicular to the preset plane may be understood as a distance between the first element 100 and the second side $A_2$ of the first sub-connecting board 310, that is, if the first element 100 is partially or completely sunk into the first sub-connecting board 310, the first element 100 needs to at least keep the preset distance from an other side of the first sub-connecting board 310, to prevent the first element 100 from coming into contact with the second sub-connecting board 320. In addition, this distance may be used as a process space when the first element 100 is connected to the first sub-connecting board 310, to ensure a good connection effect between the first element 100 and the first sub-connecting board 310. In addition, the first element 100 at least keeps a preset specific distance from the other side of the first sub-connecting board 310, so that this part of space can play a role in avoiding a circuit or a connecting pin on the second sub-connecting board 320.

In an embodiment of this application, a thickness of the first sub-connecting board 310 is 0.4 mm to 1.0 mm, and a thickness of the second sub-connecting board 320 is 0.4 mm to 1.0 mm. In existing electronic devices, the thickness of the first sub-connecting board 310 is generally set to 0.5 mm to 0.8 mm, and the thickness of the second sub-connecting board 320 is also generally set to 0.5 mm to 0.8 mm. In this embodiment of this application, the thickness of the first sub-connecting board 310 may be set to 0.6 mm, and the thickness of the second sub-connecting board 320 may be set to 0.5 mm. When the first sub-connecting board 310 and/or the second sub-connecting board 320 need(s) to be set thicker, the thickness of the first sub-connecting board 310 may be set to about 1.0 mm, or may be set to be greater than 1.0 mm according to actual situations, and the thickness of the second sub-connecting board 320 may be set to about 1.0 mm, or may be set to be greater than 1.0 mm according to the actual situations. In addition, the thicknesses of the first sub-connecting board 310 and the second sub-connecting board 320 may also be set to be less than 0.3 mm, and in this case, the first sub-connecting board 310 and the second sub-connecting board 320 are generally made of flexible boards. Definitely, the specific thicknesses of the first sub-connecting board 310 and the second sub-connecting board 320 are not limited in this embodiment of this application, and the thicknesses of the first sub-connecting board 310 and the second sub-connecting board 320 may be set according to actual requirements in actual production and processing.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

The embodiments in this specification are all described in a progressive manner. Description of each of the embodiments focuses on differences from other embodiments, and reference may be made to each other for the same or similar parts among the embodiments.

Although exemplary embodiments of the embodiments of this application have been described, a person skilled in the art can make other changes and modifications to these embodiments once they know the basic creative concept of this application. Therefore, the claims of this application include the exemplary embodiments and all changes and modifications falling within the scope of the embodiments of this application.

The radio frequency test probe structure, the radio frequency test apparatus, and the system provided in this application are described in detail above. The principle and implementations of this application are described in this specification by using specific examples. The descriptions of the foregoing embodiments are merely used for helping understand the method and core ideas of this application. Meanwhile, a person of ordinary skill in the art may make modifications to the specific implementations and application scopes according to the ideas of this application. In conclusion, the content of the specification should not be construed as a limitation to this application.

What is claimed is:

1. An electronic element connection structure, comprising:
   a connecting board;
   a first element, which is an antenna elastic piece, connected to one side of the connecting board; and
   a second element, which is a SIM card holder, connected to an other side of the connecting board;
   wherein a vertical projection of the first element on a preset plane overlaps with a vertical projection of the second element on the preset plane, wherein the preset plane is parallel to a plane on which at least one of the one side or the other side of the connecting board is located;
   wherein a distance between the first element and the second element in a direction perpendicular to the preset plane is greater than or equal to a threshold distance; and
   wherein a protrusion of a part of the connecting board is arranged on the one side of the connecting board, and the first element is connected to the protrusion.

2. The electronic element connection structure according to claim 1, wherein the connecting board comprises a first sub-connecting board and a second sub-connecting board, the first element is connected to a first side of the first sub-connecting board, and the second element is connected to a second side of the second sub-connecting board;
   wherein a second side of the first sub-connecting board is connected to a first side of the second sub-connecting board, and an area of the first sub-connecting board is less than that of the second sub-connecting board; and
   wherein the first side of the first sub-connecting board is opposite to the second side of the first sub-connecting board, and the first side of the second sub-connecting board is opposite to the second side of the second sub-connecting board.

3. The electronic element connection structure according to claim 2, wherein the first element is sunk into the first sub-connecting board, and the distance between the first element and the second sub-connecting board in the direction perpendicular to the preset plane is greater than or equal to a preset distance.

4. The electronic element connection structure according to claim 2, wherein the first sub-connecting board and the second sub-connecting board are connected to each other by welding.

5. The electronic element connection structure according to claim 3, wherein the first sub-connecting board and the second sub-connecting board are connected to each other by welding.

6. The electronic element connection structure according to claim 2, wherein a thickness of the first sub-connecting board is 0.4 mm to 1.0 mm, and a thickness of the second sub-connecting board is 0.4 mm to 1.0 mm.

7. The electronic element connection structure according to claim 3, wherein a thickness of the first sub-connecting board is 0.4 mm to 1.0 mm, and a thickness of the second sub-connecting board is 0.4 mm to 1.0 mm.

8. The electronic element connection structure according to claim 2, wherein a thickness of the first sub-connecting board is less than 0.3 mm, and a thickness of the second sub-connecting board is less than 0.3 mm.

9. The electronic element connection structure according to claim 1, wherein the connecting board is a PCB.

10. The electronic element connection structure according to claim 1, wherein the threshold distance is a minimum distance that prevents mutual interference between the first element and the second element.

11. An electronic device, comprising:

a housing; and the electronic element connection structure according to claim 1, wherein the electronic element connection structure is connected to the housing.

12. An electronic element connection structure, comprising:

a connecting board;

a first element, which is an antenna elastic piece, connected to one side of the connecting board; and a second element, which is a SIM card holder, connected to an other side of the connecting board;

a distance between a vertical projection of the first element on a preset plane and a vertical projection of the second element on the preset plane is less than a threshold distance, wherein the preset plane is parallel to a plane on which at least one of the one side or the other side of the connecting board is located;

wherein a distance between the first element and the second element in a direction perpendicular to the preset plane is greater than or equal to the threshold distance; and wherein a protrusion is arranged on the one side of the connecting board, and the first element is connected to the protrusion.

13. The electronic element connection structure according to claim 12, wherein the connecting board comprises a first sub-connecting board and a second sub-connecting board, the first element is connected to a first side of the first sub-connecting board, and the second element is connected to a second side of the second sub-connecting board;

wherein a second side of the first sub-connecting board is connected to a first side of the second sub-connecting board, and an area of the first sub-connecting board is less than that of the second sub-connecting board; and wherein the first side of the first sub-connecting board is opposite to the second side of the first sub-connecting board, and the first side of the second sub-connecting board is opposite to the second side of the second sub-connecting board.

14. The electronic element connection structure according to claim 13, wherein the first element is sunk into the first sub-connecting board, and the distance between the first element and the second sub-connecting board in the direction perpendicular to the preset plane is greater than or equal to a preset distance.

15. The electronic element connection structure according to claim 13, wherein the first sub-connecting board and the second sub-connecting board are connected to each other by welding.

16. The electronic element connection structure according to claim 14, wherein the first sub-connecting board and the second sub-connecting board are connected to each other by welding.

17. The electronic element connection structure according to claim 13, wherein a thickness of the first sub-connecting board is 0.4 mm to 1.0 mm, and a thickness of the second sub-connecting board is 0.4 mm to 1.0 mm.

18. The electronic element connection structure according to claim 13, wherein a thickness of the first sub-connecting board is less than 0.3 mm, and a thickness of the second sub-connecting board is less than 0.3 mm.

19. The electronic element connection structure according to claim 12, wherein the connecting board is a PCB.

20. The electronic element connection structure according to claim 12, wherein the threshold distance is a minimum distance that prevents mutual interference between the first element and the second element.

\* \* \* \* \*